US007971248B2

(12) United States Patent
Nagpal et al.

(10) Patent No.: US 7,971,248 B2
(45) Date of Patent: Jun. 28, 2011

(54) TOLERATING AND DETECTING ASYMMETRIC RACES

(75) Inventors: Rahul Nagpal, Faridabad (IN); Darko Kirovski, Kirkland, WA (US); Benjamin G. Zorn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 986 days.

(21) Appl. No.: 11/839,017

(22) Filed: Aug. 15, 2007

(65) Prior Publication Data

US 2009/0049545 A1    Feb. 19, 2009

(51) Int. Cl.
    *G06F 11/00*    (2006.01)
(52) U.S. Cl. .......... 726/22; 709/225; 718/100; 718/102; 718/103; 718/107
(58) Field of Classification Search ....... 726/22
    See application file for complete search history.

(56) References Cited

U.S. PATENT DOCUMENTS

| | | | |
|---|---|---|---|
| 5,095,423 A | | 3/1992 | Gramlich et al. |
| 5,339,427 A * | | 8/1994 | Elko et al. ............ 718/103 |
| 6,343,371 B1 | | 1/2002 | Flanagan et al. |
| 6,772,367 B1 * | | 8/2004 | Tarafdar et al. ............ 714/11 |
| 6,851,075 B2 | | 2/2005 | Ur et al. |
| 7,028,119 B2 | | 4/2006 | Hue |
| 7,590,737 B1 * | | 9/2009 | Chen et al. ............ 709/226 |
| 7,657,792 B2 * | | 2/2010 | Krauss ............ 714/38 |
| 2003/0131283 A1 * | | 7/2003 | Ur et al. ............ 714/36 |
| 2003/0140210 A1 * | | 7/2003 | Testardi ............ 711/203 |
| 2005/0038806 A1 * | | 2/2005 | Ma ............ 707/102 |
| 2005/0216798 A1 * | | 9/2005 | Yu ............ 714/718 |
| 2005/0283781 A1 * | | 12/2005 | Karp et al. ............ 718/100 |
| 2006/0159103 A1 * | | 7/2006 | Jain et al. ............ 370/395.7 |
| 2006/0277551 A1 * | | 12/2006 | Accapadi et al. ............ 718/107 |
| 2007/0186215 A1 * | | 8/2007 | Rajwar et al. ............ 718/102 |
| 2008/0162776 A1 * | | 7/2008 | Krauss ............ 711/100 |

OTHER PUBLICATIONS

Eugene Tsyrklevich and Bennet Yee, "Dynamic Detection and Prevention of Race Conditions in File Accesses", Department of Computer Science and Engineering, University of California, San Diego, 12th USENIX Security Symposium, Aug. 2003, pp. 243-255.

Yuan Yu, Tom Rodeheffer, and Wei Chen, "RaceTrack: Efficient Detection of Data Race Conditions via Adaptive Tracking", SOSP '05, Oct. 2005.

Nels E. Beckman, "A Survey of Methods for Preventing Race Conditions", May 10, 2006, pp. 1-20.

Ashis Tarafdar and Vijay K. Garg, "Software Fault Tolerance of Concurrent Programs Using Controlled Re-execution", Lecture Notes in Computer Science; vol. 1693, Proceedings of the 13th International Symposium on Distributed Computing, 1999, pp. 210-224.

* cited by examiner

*Primary Examiner* — Kambiz Zand
*Assistant Examiner* — Yonas Bayou
(74) *Attorney, Agent, or Firm* — Workman Nydegger (57) ABSTRACT

Detecting and/or tolerating races. Races occur due to malicious threads not respecting software locks. A method of detecting and/or correcting races includes making local copie(s) and reference copie(s) of shared data. Any read and write operations performed by a safe thread are caused to be performed on the local copie(s) during a critical section. The critical section defines a time frame which a variable lock is placed on shared data. Any read and write operations performed by malicious threads are allowed to be performed on the shared data during the critical section. The shared data, the local copie(s), and the reference copie(s) are compared to determine that a race has been detected. An indication can be output that a race has occurred or the race can be corrected.

16 Claims, 3 Drawing Sheets

TOLERATING AND DETECTING ASYMMETRIC RACES

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the patent and trademark office patent file or records, but otherwise reserves all copyright rights whatsoever.

BACKGROUND

Background and Relevant Art

Computers and computing systems have affected nearly every aspect of modern living. Computers are generally involved in work, recreation, healthcare, transportation, entertainment, household management, etc.

Modern computers are capable of executing multiple sets of operations, or threads, concurrently. Typically, to prevent different threads from reading and writing to resources at the same time, software locks are used. A software lock allows a thread to indicate that a particular resource, such as for example a shared data, is being used by the particular thread and that other threads should not access the resource for reading or writing until the particular thread has completed a given set of operations. Threads that respect these software locks are referred to herein as safe threads. However, due to poor programming, when the software evolves and assumptions made by one programmer are violated by others or for other reasons, some threads may be implemented in a system which do not respect the software locks. These threads are referred to herein as malicious threads. As a result of these malicious threads, race conditions may occur. Race conditions are memory errors that occur when multiple threads read and write a memory location in an underspecified order. Because race conditions depend on the interleaving of the memory operations of individual threads, they are notoriously difficult to reproduce and represent a major obstacle in the task of writing correct concurrent programs. Additionally, the advent of commercial multicore processors and the associated need for aggressively multithreading the existing as well as the newly written code has contributed to the perpetuation of this problem.

Figure 1A:
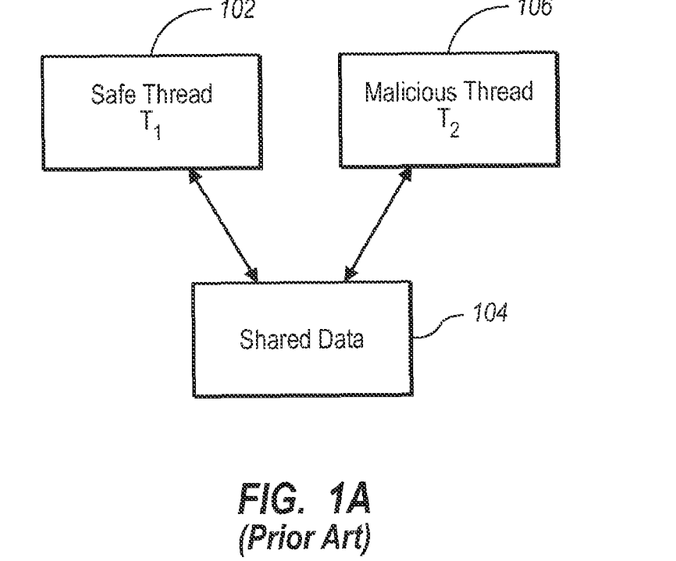
FIG. 1A illustrates a safe thread and a malicious thread operating on shared data.
Figure 1B:
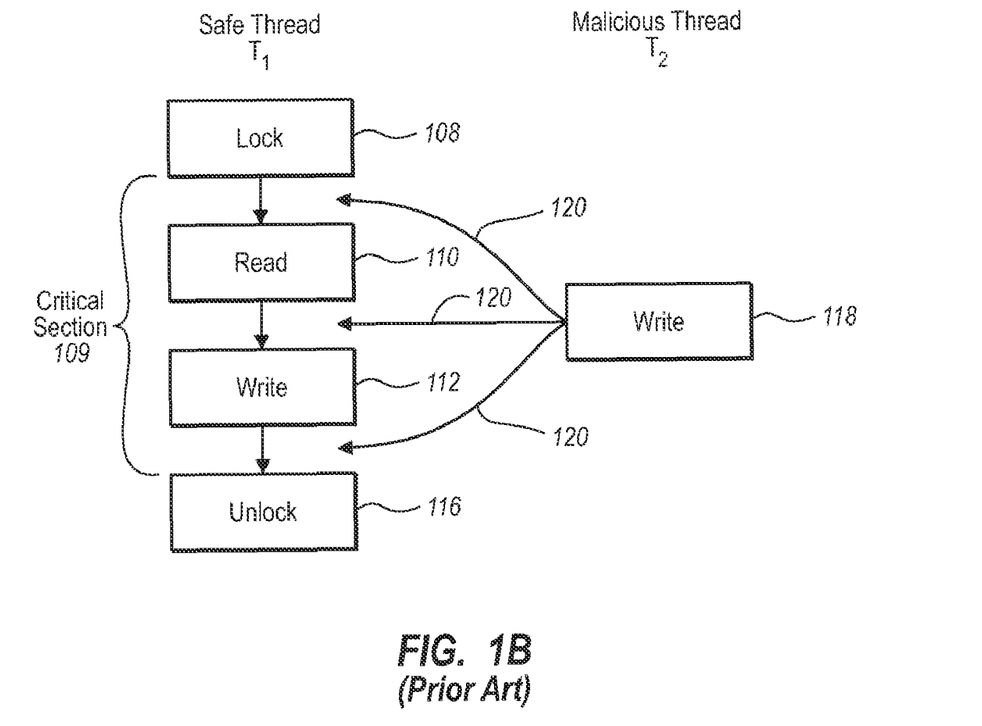
FIG. 1B illustrates a sequence of events resulting in race conditions.

Referring now to FIG. 1A, and example of how software locking mechanisms and an example of a race condition is illustrated. In FIG. 1A, a safe thread 102 reads and writes to a shared data 104. Similarly, a malicious thread 106 reads and writes to the same shared data 104. Because the malicious thread does not respect software locks, unexpected values may be read from or written to the shared data 104 by the safe thread 102 and/or the malicious thread 106. One example of where this occurs is illustrated in FIG. 1B. FIG. 1B illustrates a flow chart showing a sequence of operations performed by both the safe thread 102 and the malicious thread 106. FIG. 1B illustrates that the safe thread 102 first performs a lock function 108. The lock function 108 includes setting a software lock intended to prevent other threads from accessing the shared data 104. This begins a critical section 109 of operations. The safe thread 102 then reads the shared data 104 as illustrated at 110. Based on the data that has been read at 110, the safe thread 102 performs a write operation 112 on the shared data 104. Finally, because the safe thread 102 has finished processing operations on the shared data 104, the safe thread 102 unlocks the shared data 104 as illustrated at 116, ending the critical section 109 of operations. FIG. 1B further illustrates that the malicious thread 106 performs a write operation 118. The malicious thread 106 does not respect the software lock implemented at 108. As such, the malicious thread performs operations on the shared data 104 irrespective of the lock placed by the safe thread 102. If the malicious thread performs a write operation 118 at any of the times indicated by the arrow 120, a race condition will occur with respect to one or more of the threads 102 and 106.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment disclosed herein includes a method of detecting and/or tolerating races occurring due to malicious threads not respecting software locks. The method may be practiced, for example, in a computing environment supporting multi thread operations. Different threads can perform read and write operations on shared data. The environment includes safe threads that are properly configured to use variable locks on shared variables. The method includes making local copie(s) and reference copie(s) of the shared data. Any read and write operations performed by a safe thread are caused to be performed on the local copie(s) of the shared data during a critical section. The critical section defines a time frame which a variable lock is placed on shared data. Any read and write operations performed by malicious threads are allowed to be performed on the shared data during the critical section. The shared data, the local copie(s), and the reference copie(s) are compared to determine that a race has occured. A race existing when a final computation state of all threads after having executed does not correspond to a case when all the threads would have executed as safe threads with atomic and sequential memory consistency. The method further includes at least one of indicating that a race has occurred or correcting the race.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

Some illustrative embodiments described herein include functionality for addressing race conditions. For example, some embodiments include functionality for detecting race conditions and reporting the race conditions. Some embodiments include functionality for tolerating race conditions. Some embodiments include functionality for correcting race conditions. Further, some embodiments include the use of an oracle to detect, characterize, and/or correct race conditions.

Embodiments may be implemented in a number of different scenarios and for use with a number of different hardware and software configurations. For example, in one embodiment functionality may be implemented in hardware or software debugging tools to allow developers to detect and correct race conditions. In an alternative embodiment, functionality may be implemented as part of a software package released to consumers to correct known problems or as protection against race conditions which may occur unexpectedly.

Further, embodiments may be implemented wholly by loading software capable of importing the functionality into volatile memory of a computer system. Alternatively, embodiments may be implemented where hardware has been configured by hard coding instructions into the hardware to perform some or all of the functionality implemented in some embodiments.

Figure 2:
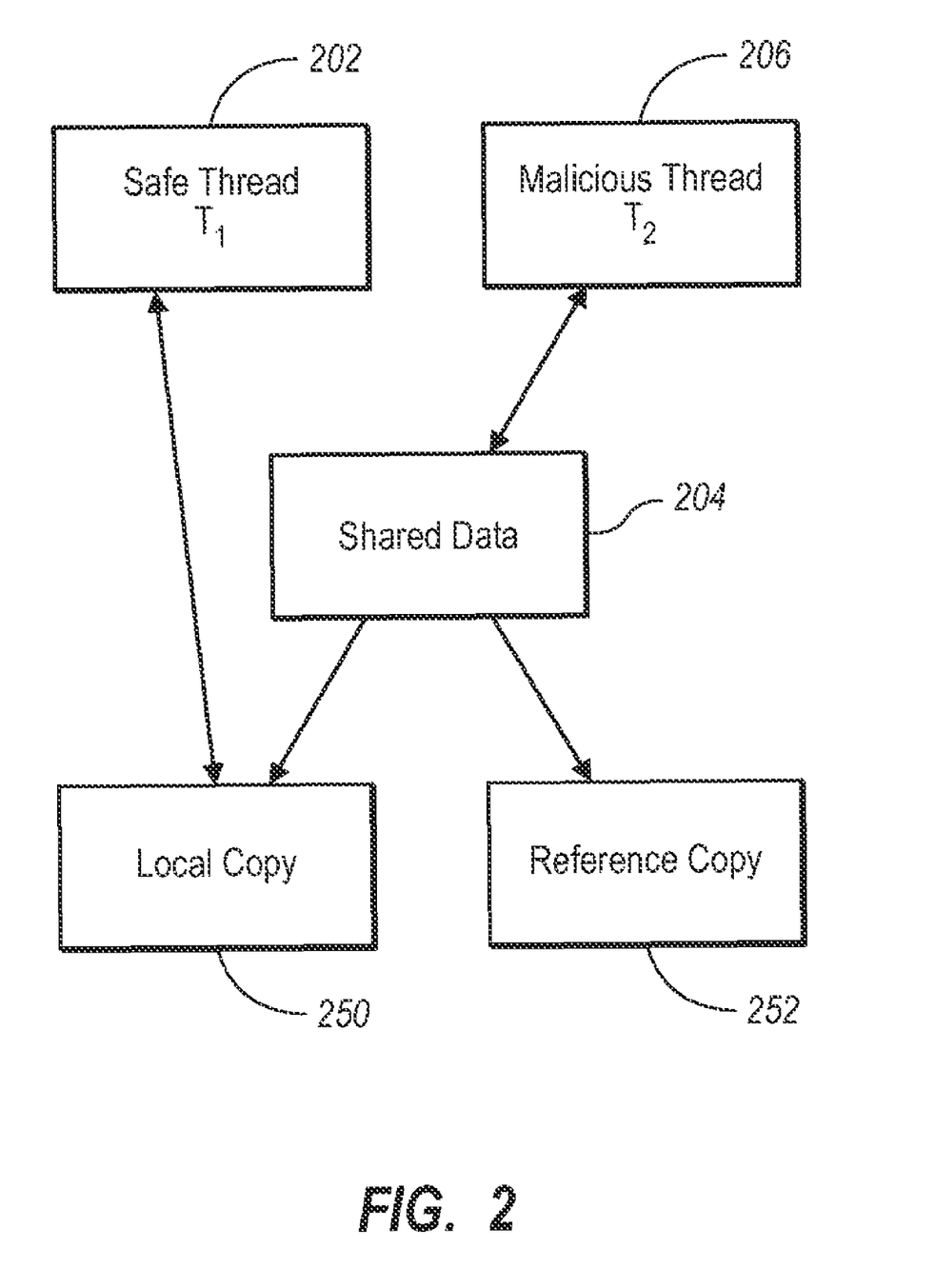
FIG. 2 illustrates use of local and reference copies of shared data to tolerate and/or detect races.

FIG. 2 illustrates one example embodiment where race conditions can be detected and in some cases tolerated. FIG. 2 illustrates that the shared data 204 is written to two copies, namely a local copy 250 and a reference copy 252. The safe thread 202 performs operations on the local copy 250 while the malicious thread 206 is allowed to perform operations on the shared data 204. The reference copy 252 remains unchanged by the safe thread 202 or the malicious thread 206 during a critical section of operations. Comparisons of the shared data 202, the local copy 250, and the reference copy 252, can be used to determine if a race has occurred and can be used in some cases to determine if a race can be tolerated including if operations can be performed on the shared data 204 to correct certain race conditions.

Figure 3:
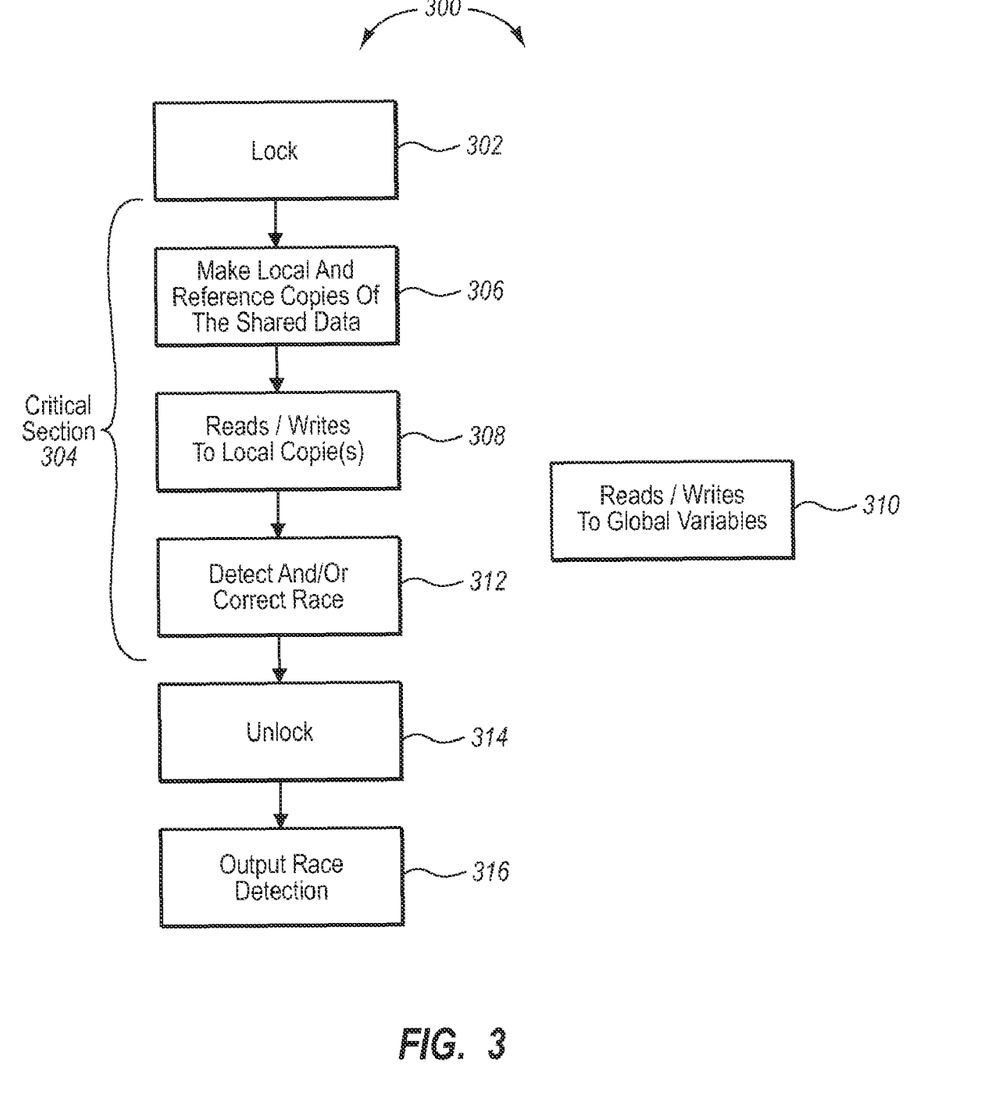
FIG. 3 illustrates a method of detecting races.

Referring now to FIG. 3, a flow chart illustrating a method 300 which includes various acts for detecting a race condition, where the method is described in conjunction with the actions of a safe thread and a malicious thread. FIG. 3 illustrates that a safe thread performs a lock operation 302. This causes the safe thread to enter a critical section 304 which is a time frame in which a variable lock is placed on shared data.

The method of 300 illustrates an act of making local and reference copies of the shared data (act 306). For example, as illustrated in FIG. 2, a local copy 250 and a reference copy 252 of the shared data 204 may be made. Note that while certain orders may be shown for acts to be performed, the order indicated is not necessarily required when recited in a particular order by the claims herein. The method 300 further includes an act of causing any reads or write operations performed by the safe thread to be performed on the local copies of the shared data (act 308). Thus as illustrated in FIG. 2, the safe thread 202 performed read and write operations on the local copy 250.

The method 300 further includes an act of allowing any read and write operations performed by malicious threads to be performed on the shared data (act 310). As illustrated in FIG. 2, the malicious thread 206 performs operations on the shared data 204.

The method 300 further includes an act of detecting a race (act 312). Detecting a race may be performed for example by comparing the shared data, local copies, and reference copies to determine that a race has been detected. A race exists when a final computation state of all threads after having executed does not correspond to a case when all the threads executed as safe threads with atomic and sequential memory consistency. The method 300 illustrates that the software lock is released at 314 which causes the safe thread 202 to exit the critical section. When the race has occurred, the method 300 further includes an act of outputting that a race has been detected act (316).

The method 300 may include further actions as alluded to previously to apply a resolution function which defines the value of one or more of shared data to correct a detected race. In some embodiments and for some conditions it may be appropriate to cause the shared data to be the same value as the local copies. In other embodiments, it may be appropriate to cause the shared data to remain at its present value.

Notably, implementation of the preceding race detecting and tolerance mechanism may actually cause operations that are susceptible to other races affecting shared data. For example, during the period where local and reference copies are made of the shared data at 306, operations may be performed on the shared data. Similarly, when the shared data is being set to a value to correct a race at the conclusion of a critical section, additional races conditions may occur. These races can be corrected and reduced by doing comparisons to determine if a race has occurred during this period and recopying data as appropriate. When the recopying is done, it can be done using cached data such that the copying occurs more quickly and reduces the time available for a race detection and/or tolerating mechanism caused race to occur. This will be discussed in more detail below.

Embodiments may be implemented in a number of environments and for different purposes. For example, some embodiments may be implemented as software used for code debugging. Alternatively, software including the race tolerating mechanisms may be included as a software patch to correct issues related to race conditions.

Some software embodiments are implemented by inserting code into a critical section code block to create the local copies 250 and reference copies 252 as part of the code in the critical section. Other embodiments may include code external to the critical section, which allows for certain race conditions to be corrected by overwriting shared data with the local copy 250 at a time after the critical section.

Some embodiments may be implemented using hardware. The hardware can include a race detection oracle which can indicate if a race has occurred, correct certain race conditions, and/or indicate the effective ordering of operations on a shared variable to the race conditions and/or corrective actions taken after a critical section has been exited.

While the preceding has provided a general overview of some embodiments described herein, the following presents a more technical description and provides additional details which may be helpful in understanding and implementing some embodiments.

Threads are a way for a program to split itself into two or more running tasks which can execute concurrently on two or more processors in a multiprocessor computer or time sliced within a single processor. A thread, sometimes referred to herein as T, is an independent program execution construct with a single-entry single-exit control-flow graph, sometimes denoted by G(T), that shares the program state with all other threads launched within the same process. A control flow graph (CFG) is a representation, using graph notation, of all paths that might be traversed through a program during its execution. Each node in the graph represents a basic block. Directed edges are used to represent jumps in the control flow.

In the following examples, an arbitrary context-switch between threads is allowed, and no additional constraints are imposed for the framework depending on the type of thread realization: multi-processor or time-sliced.

A shared variable, which may be shared data 204 illustrated in FIG. 2, is a variable in the program memory space that can be accessed by at least two concurrently running threads. For the examples herein, a variable is shared even if two instances of the same thread can run concurrently and access it.

A lock is a synchronization mechanism for enforcing limits on access to a resource in a process with at least two concurrent threads of execution. Reserving or releasing a lock is an atomic primitive that can be done, for example, using a test-and-set instruction in single-processor architectures. In some embodiments, the atomicity of lock manipulation is resolved efficiently at the compiler/hardware level. A lock, sometimes referred to herein as $x_V$, is typically associated with a group of shared variables, referred to herein as V. The purpose of $x_V$ is to enforce exclusive access by a specific thread to any variable in V.

A critical section is a subgraph G of the control-flow graph $G \subset G(T)$ of a specific thread T such that all entry points to G acquire a specific lock $x_V$ and all exit points out of G release $x_V$. In this example, the thread T enters the critical section to gain exclusive access to the shared variable V. Arbitrary overlap or nesting of critical sections is allowed over distinct locks within the same thread. As used herein, l( ) and u( ) are the atomic functions that acquire and release a specific lock respectively. Also, r( ) and w( ) are denoted as two functions that read from and write to a specific variable. For the first examples shown herein it should be assumed that a single variable is protected and accessed. The functions r, and w denote the fundamental functions over that specific variable. The function l and u are associated with a region of code to guard the region of code against simultaneous access. Finally, x denotes a "don't care" function which can be either a read or a write.

The control-flow graph of a critical section may create numerous different sequences of reads and writes depending on the machine state. With no loss of generality, a notation is used where a sequence of reads and writes is presented using an unfolded format (sequential, non-conditional). A sequence of at least one read is denoted as $r^+$ and a sequence of a non-negative number of reads as $r^*$, thus $r^+ \equiv rr^*$. Operators * and + are equally defined for writes. For a specific thread $T_1$ the sequence of critical operations is defined using the above operators and fundamental functions. For example $T_1 = [l_1 r_{11} w_{12}^+ u_1]$ denotes a thread that first locks in a variable then reads and writes exactly once, followed by at least one read before it unlocks this variable. The first digit in the operation index denotes the thread index, i.e. $T_1$, and the second distinguishes between sequences of operations of the same type. In another example $T_2 = [l_1 r_1 x_1^+ u_1]$ denotes a critical section with one read followed by at least one more operation which can be either a read or a write.

The following denotes one possible interleaved execution of critical operations of two threads $T_1 = [l_1 r_{11} w_{11} r_{12}^+ u_1]$ and $T_2 = [w_2]$ as the following sequence $S = \{l_1 r_{11} w_{11} w_2 r_{12}^+ u_1\}$. Sequence S specifies that the write from the second thread occurred after the write in the first thread to result in a race condition.

A race condition is a flaw in a process whereby its output is unexpectedly and critically dependent on the sequence or timing of other events. What qualifies as a race condition is influenced by the underlying program semantics. For example, two threads may write into a single variable, both of them without obtaining a proper lock to protect this variable. Only semantics defined by the programmer in this case could determine whether this is a true race condition or not. The following embodiments are directed to cases where one thread, in this example safe thread $T_1$, properly obtains a lock over a specific variable, and another thread malicious thread $T_2$ executes in parallel and accesses the same variable without obtaining a proper lock. In this case numerous interleavings between executions of $T_1$ and $T_2$ could occur.

To characterize asymmetric races, the following illustrates possible interleavings between operations in a correctly synchronized thread and a second, un-synchronized thread. As will be later shown, the interleavings that result in races can be grouped into four classes. Illustrations of how the race detection and/or tolerating mechanism described herein handles each class is then discussed. For the following example, it is assumed that a programming model with two types of threads is being implemented. The two types of threads, as discussed previously are a safe thread, such as the safe thread 202 in FIG. 2, which has a single critical section, and a malicious thread, such as thread 206 in FIG. 2, which does not have a critical section although it could access a shared variable.

A race condition represents any one of all possible execution interleavings of a set of threads $TT = \{T_1 \ldots T_N\}$ where at least one of the threads in TT is malicious and at least one is safe, such that the final computation state after all threads have executed does not correspond to the case when all safe threads have executed atomically with sequential memory consistency. For the following example, it is assumed that the programmer intended that the threads can be executed in any order, as long as they execute atomically with respect to their critical sections. If this was not the programmer's intent, approaches to address this issue can be nonetheless be used in conjunction with the race detection and/or tolerating mechanisms described herein.

A thread (safe or malicious) in TT could execute but not affect the program computation state. In this case, determination of a race condition can be informally relaxed to accept execution schedules where a subset of threads from TT does not execute as correct.

Using this definition, the sequence S presented earlier represents a race because $T_2$ does not execute atomically due to the interleaving of $W_2$. Sequences $\{w_2 l_1 r_{11} r_{12}^+ u_1\}$ or $\{l_1 r_{11} w_{11} r_{12}^+ w_2 u_1\}$ are not considered races as they correspond to the atomic execution of the safe thread $T_1$. For the purposes of this discussion, it is assumed the hardware supports sequential memory consistency semantics and that the race detection and/or tolerating mechanisms described herein preserves these semantics. These restrictions will later be relaxed by considering the general case of races occurring within critical sections that protect multiple variables as well as critical sections that are nested and/or overlapped.

To understand the ways in which the safe and malicious threads can interact, consideration is made of interleavings where the malicious thread $T_2$ executes between operations in the safe thread $T_1$. There are three ways in which a sequence of operations by a single thread can interact with a single variable: by reading it only ($r^+$), by setting its value regardless of its prior value ($wx^*$), and by setting its value based upon its prior value ($r^+wx^*$). Operations that follow a write by a particular thread are important semantically but do not affect the inter-thread interactions. Also note that rw could occur in two versions, namely: (i) when w is dependant upon the value retrieved by r and (ii) when w is not dependent upon the value retrieved by r. Sequences where (ii) is true, could be analyzed as independent manifestations of two sequences of type $r^+$ and $wx^*$. Sequences where (i) is true, demand special attention; thus, herein when a sequence rw issued by the same thread is specified, (i) should be assumed.

Reference is now made to the following table, Table 1.

TABLE 1

| Operation interleaving | | | | Operation interleaving | | | | Operation interleaving | | | |
|---|---|---|---|---|---|---|---|---|---|---|---|
| $T'_1$ | $T_2$ | $T''_1$ | Race | $T'_1$ | $T_2$ | $T''_1$ | Race | $T'_1$ | $T_2$ | $T''_1$ | Race |
| $r^+$ | $r^+$ | $r^+$ | F | $r^+$ | $wx^*$ | $r^+$ | T ✓ | $r^+$ | $r^+wx^*$ | $r^+$ | T ✓ |
| $r^+$ | $r^+$ | $wx^*$ | F | $r^+$ | $wx^*$ | $wx^*$ | CT ✓ | $r^+$ | $r^+wx^*$ | $wx^*$ | CT |
| $r^+$ | $r^+$ | $r^+wx^*$ | F | $r^+$ | $wx^*$ | $r^+wx^*$ | T ✓ | $r^+$ | $r^+wx^*$ | $r^+wx^*$ | T |
| $wx^*$ | $r^+$ | $r^+$ | F | $wx^*$ | $wx^*$ | $r^+$ | T ✓ | $wx^*$ | $r^+wx^*$ | $r^+$ | T ✓ |
| $wx^*$ | $r^+$ | $wx^*$ | T ✓ | $wx^*$ | $wx^*$ | $wx^*$ | F | $wx^*$ | $r^+wx^*$ | $wx^*$ | CT ✓ |
| $wx^*$ | $r^+$ | $r^+wx^*$ | T ✓ | $wx^*$ | $wx^*$ | $r^+wx^*$ | T ✓ | $wx^*$ | $r^+wx^*$ | $r^+wx^*$ | T ✓ |
| $r^+wx^*$ | $r^+$ | $r^+$ | F | $r^+wx^*$ | $wx^*$ | $r^+$ | T ✓ | $r^+wx^*$ | $r^+wx^*$ | $r^+$ | T |
| $r^+wx^*$ | $r^+$ | $wx^*$ | T ✓ | $r^+wx^*$ | $wx^*$ | $wx^*$ | CT ✓ | $r^+wx^*$ | $r^+wx^*$ | $wx^*$ | CT |
| $r^+wx^*$ | $r^+$ | $r^+wx^*$ | T ✓ | $r^+wx^*$ | $wx^*$ | $r^+wx^*$ | T ✓ | $r^+wx^*$ | $r^+wx^*$ | $r^+wx^*$ | T |

Table 1 tabulates possible interactions between two threads: a safe thread $T_1$ and a malicious thread $T_2$. The safe thread is improperly intercepted by $T_2$ at a position that slices the operations of $T_1$ into two parts $T'_1$ and $T''_1$. The table evaluates the outcome of this interaction exhaustively. Symbols T and F specify that a race has and has not occurred respectively. Symbol CT points to the fact that a race occurs conditionally. The condition is that $T_2$ alters at least one more live variable in the program computation state. This variable could be local to the thread. Symbol ✓ identifies whether one embodiment of the race detection and/or tolerating mechanism described herein tolerates a specific atomic race type.

From Table 1. A race between two threads occurs due to one of the following four conditions denoted by roman numerals I-IV.

I XwR≡$\{l_1x_1{}^+w_2x_2{}^*r_1u_1\}$. This case specifies that for any sequence of operations by $T_2$ that starts with a write and is followed by a read by $T_1$, a race will occur.

II WrW≡$\{l_1r_{11}{}^*w_{11}x_1{}^*r_2{}^-r_{12}{}^*w_{12}u_1\}$. This case specifies that any sequence of reads by $T_2$ when placed in between two writes by $T_1$ results in a race.

III RXwW≡$\{l_1r_1x_1{}^*w_2x_2{}^*w_1u_1\}$. When $T_1$ starts with a read followed by an arbitrary sequence of operations, and $T_2$ executes any sequence of operations that starts with a write just before $T_1$ writes back to this variable, a race will occur. An additional constraint is that $T_2$ alters at least one more live variable in a program's computation state besides the variable protected by $T_1$. This variable does not need to be shared.

IV XrwX≡$\{l_1x_{11}{}^-r_2{}^+w_2x_2{}^*x_{12}u_1\}$. This case specifies that any sequence that starts by a write based upon a prior read by $T_2$ causes a race when interspersed in-between any two operations of $T_1$. This statement is conditional in certain special cases. A special subset of XrwX, denoted as $R_2 \equiv \{l_1w_{11}x_1{}^*r_2{}^+w_2x_2{}^*w_{12}u_1\}$, is an indirect race only if $T_2$ alters at least one live variable $u \neq v$ in a program's computation state as $u=f(v)$, where $f(\ )$ is an arbitrary non-constant function and V is the variable protected by $T_1$. For sequences in $\{l_1x_1{}^+r_2{}^+w_2x_2{}^*w_1u_1\}-R_2$, an additional constraint is that $T_2$ alters at least one more live variable in program's computation state besides V.

With no effect on the generality of the above, in all sequences it is assumed that the last operation in $T_1$ which completes the race condition, is the last operation in the critical section.

The sequence in category IV, $r_2{}^+w_2x_2{}^*w_{12}$, is now analyzed in more detail. There are two sub-cases:

$R_1 \equiv \{l_1r_1x_1{}^*r_2{}^+w_2x_2{}^*w_{12}u_1\}$, which is not a direct race as it corresponds to $T_2$ never executing with respect to the protected variable. In case $T_2$ alters any other live variable in program's computation state, this sequence is an indirect race.

$R_2 \equiv \{l_1w_{11}x_1{}^*r_2{}^+w_2x_2{}^*w_{12}u_1\}$ is not a direct race as it could correspond to $T_2$ never executing with respect to the protected variable V or it could correspond to the execution schedule $T_2T_1$. In the first case, if $T_2$ alters any other live variable in program's computation state, this sequence is an indirect race. In the second case, if $T_2$ alters any other live variable u in program's computation state as $u=f(V)$ where $f(\ )$ is an arbitrary non-constant function, this sequence is also an indirect race.

All considered sequences cover $x_{11}{}^-x_2{}^+x_{12} \cup x_1{}^+x_2{}^+r_1{}^+w_1$. The conditions that are to be satisfied for races of type III and some races of type IV to occur, are relatively mild. Thus, herein unless noted otherwise, it is assumed that they are fulfilled for each malicious thread. A race condition among K>2 threads can be reduced to one of the I-IV cases of a race between two threads.

One principle to the approach to tolerating and detecting the race condition cases specified above is to replicate the protected shared state so that the thread that acquires a lock on the shared state has an exclusive copy. For example, FIG. 2 illustrates that the safe thread 202 has the local copy 250 as an exclusive copy. This thread continues reading from and/or writing to this copy until it releases the lock. When the lock is released, The race detection and/or tolerating mechanisms described herein provides a family of mechanisms to determine which race condition case has occurred, with possible outcomes ranging from tolerating the race completely, to reporting that a race has occurred, to executing a programmer specific handler when an intolerable race is detected. In this section, the effect of the race detection and/or tolerating mechanisms described herein on the race cases described above assuming an oracle determines which case has occurred is considered. In subsequent portions, illustrations of how different implementations could distinguish these cases in practice are shown.

In the following example, the binding of locks ($x_V$) to shared variables (V) is known before the critical section in thread $T_1$ is entered and that storage for two additional copies, V' the local copy 250 and V" the reference copy 252, of variable V has been allocated. After the lock is released, storage for the two additional copies is deallocated.

In one embodiment, after lock xv is acquired in thread $T_1$, V is copied to V' and V" (V"=V'=V). This is illustrated in FIG. 2, where the shared data 204 is copied to the local copy 250 and the reference copy 252. Because this copy operation may not be atomic without hardware support, copying may introduce additional races. The impact of these potential races and ways to mitigate them are discussed below. In general however, hardware processor caching used in conjunction with recopying operations may server to mitigate the window in which a copying window induced race may occur.

In one embodiment implemented using a software implementation, the race detection and/or tolerating mechanisms described herein alters instructions in the critical section of T to use V' instead of V. Thus, V' is a local copy of V for $T_1$ which cannot be accessed by other threads due to a race. All other threads such as $T_2$ are unchanged and continue using V for all accesses. Copy V" is not accessed until $T_1$ reaches the exit of the critical section.

When $T_1$ exits the critical section by releasing the acquired lock, The race detection and/or tolerating mechanisms described herein analyze the contents of V', the original value V", and the value V that could have been altered by other threads as a consequence of a race. Depending on the relationship of values in {V, V', V"} and knowledge about the specific case of race that has occurred, the race detection and/or tolerating mechanisms described herein may deploy a resolution function V=f(V, V', V") that defines the value of V after $T_1$ is executed to correct race conditions.

TABLE 2

| Race type | | V = V" | f(V, V', V") | Tol? | π |
|---|---|---|---|---|---|
| I | XwR | false | V | true | $T_1T_2$ |
| II | WrW | true | V' | true | $T_2T_1$ |
| III | RXwW | false | V | true | $T_1T_2$ |
| IVA | RrwW | false | V | true | $T_1T_2$ |
| IVB | WrwX | false | V' | true | $T_2T_1$ |
| IVC | RrwX | false | custom f( ) | false | N/A |

Combining the mechanism outlined above with the interleavings enumerated in Table 1, cases that the race detection and/or tolerating mechanisms described herein will tolerate are determined. Assuming perfect knowledge of the specific case of race that has occurred, Table 2 summarizes the definition of f and indicates the cases that the race detection and/or tolerating mechanisms described herein correctly tolerates. Table 1 also contains this information in expanded form, where the symbol √ denotes whether the race detection and/or tolerating mechanism oracle tolerates a specific interleaving. Because the race detection and/or tolerating mechanisms described herein can tolerate only some races of type IV, in Table 2 this case is subdivided into three sub-cases:

$$IV_A \; RrwR \equiv \{l_1 r_{11}{}^+ r_2{}^+ w_2 x_2 {}^* r_{12} u_1\}$$

$$IV_B \; WrwX \equiv \{l_1 w_{11}{}^* r_2{}^+ w_2 x_2 {}^+ x_{12} u_1\}$$

$$IV_C \; RrwX \equiv XrwX - \{RrwR \cup WrwX\}$$

The first column in Table 2 lists the race type based upon the classifications described previously, the second column specifies whether V is equal to V" at the point when f( ) is called, the third column show a resolution function f( ) that allows the race detection and/or tolerating mechanisms described herein to tolerate the race, the fourth column indicates whether f( ) provably succeeds in tolerating the race, and the fifth presents π, the schedule of threads that the race detection and/or tolerating mechanism's result represents. Table 2 shows that the race detection and/or tolerating mechanism oracle tolerates all race cases except sequences that belong to RrwX with a resolution function f( ), defined by Table 2. A simplified close-form resolution function will now be discussed. The simplified closed form resolution function is:

$$V = f(V, V', V'') \equiv \begin{Bmatrix} V', V = V'' \\ V, V \neq V'' \end{Bmatrix}$$

This simplified resolution function notes that at the end of a critical section, if the shared data V is equal to the reference copy V", then the resolution function causes the value of the shared data V to be changed to the value of the local copy V'. Alternatively, if the shared data V is not equal to the reference copy V", then the resolution function causes the value of the shared data V to remain at the value it was after the end of the critical section. By using this function, the race detection and/or tolerating mechanisms described herein provides the illusion that races classified as type I, II, III, and IVA do not affect threads sequential execution. The threads execute according to the schedule $T_1T_2$ in the case of race types I, III, and IVA, and as $T_2T_1$ in the case of a race of type II. Additional robustness could be provided by identifying that the first access to the protected variable in $T_1$ is a write. When this is the case and V≠V", the race detection and/or tolerating mechanisms described herein would accept V' as V at the exit of $T_1$ and thus correctly resolve races of type $IV_B$ using the schedule $T_2T_1$. That would also affect race conditions $\{l_1 w_1 x_1{}^* w_2 x_2{}^* r_1 u_1\} \subset XwR$ to get resolved using the same schedule $T_2T_1$. As a software-only solution to tolerating races of type $IV_B$ may be computationally expensive, in the remainder of this disclosure, RrwX refers to {RrwR∪WrwX}.

For races of type RrwX, the interleaving of reads and writes from $T_2$ breaks the program's sequential memory consistency. Here, $T_1$ and the interleaved part of $T_2$ both read the value of the shared variable before entering the critical section, execute in parallel, and then join at the exit of the critical section of $T_1$. In this case, either schedule $T_1$; $T_2$ or $T_2$; $T_1$ results in the read of the second thread executing seeing the value of the variable written by the first thread.

If w does not depend upon r in RrwX, then the race detection and/or tolerating mechanisms described herein tolerates this case such that r effectively executes before $T_1$ and w executes afterwards, while the execution of $T_1$ is effectively uninterrupted.

Table 2 shows that with correct knowledge of what case of race has occurred, the race detection and/or tolerating mechanisms described herein will correctly tolerate all but one class of races. Depending on the final disposition of values V, V', and V''', the two possible sets of outcomes are denoted as A and B At the conclusion of $T_1$, if V=V''' then there has been a race free execution of $T_1$. Illustrating these, two cases could happen with respect to an interleaved thread $T_2$, namely, $T_2$ never wrote to V during the execution of $T_1$ and $T_2$ had a sequence of arbitrary operations $x_2^+$ before finally writing V''' to V.

In the former case, only a WrW race type could have happened. From Table 2, one can verify that the race detection and/or tolerating mechanisms described herein fully tolerates such races. In the latter case, a race could occur only due to a race of type RrwX (see Table 2). An interfering malicious sequence $r_2^+w_2x_2^*$ that initiates a RrwX-type race with the last write in $w_2x_2^*$ that resets V to its original value V''', is tolerated by the race detection and/or tolerating mechanisms described herein with a correct execution schedule $T_2T_1$. Because $T_2$ sets in this case the value of the shared variable V to its original value, the schedule $T_2T_1$ executes race-free. In essence, the effect of executing $T_1$ on the computation state is the same whether $T_2$ executed or not.

Thus, when the race detection and/or tolerating mechanisms described herein encounters V=V''' it exits the critical section in T by setting V=f(V, V', V''')=V', deallocating all replicated data, and unlocking $x_V$. If the construct:

if (vii==v)v=vi;

is not atomic, a race of type III or IV could occur by an interleaved $w_2(V)$. This post-execution race detection and/or tolerating mechanisms induced race is denoted as $A_P$. Thus, a race could occur using the race detection and/or tolerating mechanisms described herein if V=V''' only in the unlikely sub case $A_P$.

If V≠V''', The race detection and/or tolerating mechanisms described herein concludes that at least one interleaved $w_2(V)$ has occurred while $T_1$ executed its critical section. Several cases are possible. In cases I and $IV_A$, thread $T_2$'s write to V has occurred after all writes (if any) in thread $T_1$, hence this case is correctly tolerated by leaving V as it is, resulting in the execution order $T_1T_2$. In case III, thread $T_1$'s final memory operation is to write to V and thread $T_2$ does not read V before writing it. As a result the execution order $T_1T_2$ does not require that thread $T_2$ start executing after thread $T_1$ writes the value of V, allowing the resolution of leaving V the same on exit to provide the semantics of $T_1T_2$.

This condition does not necessarily mean that an actual race occurred. For example, sequence Xw≡{$l_1x_1*w_2u_1$} does not produce a race, yet results in V≠V'''. Because another interleaving of the same threads could result in a race (e.g. RXwW), it may be desirable in some embodiments to report these incidents to the programmer.

Case RrwX cannot be tolerated by either of the outcomes that resolve cases I-$IV_A$, and as a result, the race detection and/or tolerating mechanisms described herein will either raise an exception indicating that a race has been detected, or execute a programmer-defined resolution function, f=f', when a semantically sound resolution function is provided. Again, if the construct:

if (vii==v)v=f(v,vi,vii);

is not atomic, a race of type III or IV could occur by an interleaved $w_2(V)$. This post-execution race detection and/or tolerating mechanism induced race is denoted as $B_P$.

At this point, two definitions of dynamic race detection are introduced. In both cases the detector identifies dynamically a specific instance of interleaved execution of a thread $T_2$ with a lock-protected thread $T_1$. The instance is described as an execution of a sequence $x_2^+$ of consecutive instructions of $T_2$ in-between two consecutive instructions in $T_1$.

A hard race detector reports $x_2^+$ as a race if at least one of all possible instances of execution interleaving of $x_2^+$ with $T_1$, could cause a race. A soft race detector reports $x_2^+$ as a race if and only if the detected interleaving instance of $x_2^+$ with $T_1$ causes a race.

A soft race detector is more precise, detecting only those interleavings that result in an actual race. In deployed applications, this may be a more desirable form of race detection (as it ignores benign races), but is may also be considerably more difficult to implement. A hard race detector detects interleavings that have the potential to cause a race, but will report races in specific interleavings that did not actually exhibit a race. A hard race detector may be of greater value in a testing or debugging environment, where testers need to know about the existence of a race even when many interleavings of the race are benign, so that they can fix the code to eliminate the possibility of the race altogether.

The race detection and/or tolerating mechanisms described herein may be a deterministic hard detector of all races that are not tolerated already by the platform. Illustratively, the type of an error that is not tolerated is RrwX (see Table 2). The last write in $w_2x_2^*$ can result in V≠V''' in which case the race is detected, or V=V''' in which case the race is tolerated.

The race detection and/or tolerating mechanisms described herein may report false positives with respect to the hard race detection oracle in the case when: wWwWw≡{$l_1w_{11}^+w_2^-w_{12}^+u_1$}∪{$l_1w_1^+w_2^+u_1$}∪{$l_1w_2^+w_1^+u_1$}. Illustratively, the race detection and/or tolerating mechanisms described herein reports a race when V≠V|. This only happens if $T_2$ writes a new value to V. The only case when $T_2$ writes to V in-between two operations over V by $T_1$ and a race could not occur, is WXwW≡{$l_1w_1x_1*w_2x_2*w_1u_1$}. From the perspective of a hard race detector, if there were any reads in $x_1^*$ or $x_2^*$, there could be a possible permutation of operations in $T_1$ and $T_2$ that could lead to a race. Thus, {$l_1w_{11}^+w_2^+w_{12}^+u_1$} is one pool of cases where race detection and/or tolerating mechanisms described herein reports false positives.

The remaining cases in wWwWw represent the situations in which $T_2$ writes to V before $T_1$ writes to V' and/or $T_2$ writes to V after the last write of $T_1$ to V'. The correct execution permutations in these cases are $T_2T_1$ and $T_1T_2$ respectively.

The lock and unlock operations over V should be placed as close as possible to the first and last access to V respectively within the corresponding critical section. By doing so, the programmer reduces the likelihood that another thread places a write that could trigger a false positive by the race detection and/or tolerating mechanisms.

For a software-only implementation, the race detection and/or tolerating mechanisms described herein identify all race instances in protected threads except $A_P \cup B_P$, the race instances caused by the race detection and/or tolerating mechanism due to shared variable copying and replacement.

In the following discussion, assumptions introduced earlier are addressed and relaxed. Discussion will be directed to allowing multiple critical sections within a thread. The critical sections will be allowed to nest and overlap. Additionally, one lock will be allowed to protect a group of variables as opposed to a single variable. Two modes of thread execution are differentiated: sequentially consistent execution where instructions in the thread are executed in the order specified by the program, and out-of-order execution where instructions in the thread could be executed in an arbitrary order that does not alter program functionality.

The following illustrates where nested and interleaved critical sections within a single thread are allowed, where each critical section protects a single variable. In the general case of multi-threaded programs with threads that contain multiple critical sections per thread such that each critical section protects a single distinct shared variable, the race detection and/or tolerating mechanism oracle may not enable sequentially consistent execution. Illustratively, consider two nested critical sections within a single thread $T_1$:$l_1(x_P)l_1(x_Q)$ $w_{11}(P)r_{11}(Q) \Diamond r_{12}(Q)w_{12}(P)u_1(x_Q)u_1(x_P)$, where $\Diamond$ denotes the location where a malicious thread $T_2$ interleaves the following sequence of instructions $w_2(Q)r_2(P)$. The race detection and/or tolerating mechanisms described herein will tolerate both races from the perspective of out-of-order execution, however based upon Table 2 $w_2(Q)$ will execute after $u_1(Q)$ and $r_2(P)$ will execute before $l_1(P)$, breaking their program specified order of execution. A similar example could be constructed for two overlapping critical sections.

Next, assume that a single lock denoted as VV, i.e., critical section, protects a set of M variables VV={$V_1, \ldots, V_M$} under the original assumption that one thread represents a single critical section. In the general case of multi-threaded programs with threads that contain a single critical section which protects a set of shared variables, the race detection and/or tolerating mechanism oracle may not enable sequentially consistent execution. Illustratively, consider a critical section over a set of two variables P and Q with the following order of instructions $l_1(xp_Q)w_{11}(P)r_{11}(Q) \Diamond r_{12}(Q)w_{12}(P)u_1(xp_Q)$, where $\Diamond$ denotes the location where a malicious thread interleaves the following sequence of instructions $w_2(Q)r_2(P)$. The race detection and/or tolerating mechanisms described herein will tolerate both races from the perspective of out-of-order execution, however based upon Table 2, $w_2(Q)$ will execute after $u_1(Q)$ and $r_2(P)$ will execute before $l_1(P)$, breaking their program-specified order of execution.

In general, if a malicious thread $T_2$ which operates over VV is interleaved with a safe thread $T_1$ that properly protects the access to VV and uses the race detection and/or tolerating mechanisms described herein to handle races, then individual operations in $T_2$ will get effectively rescheduled and executed around and in parallel with $T_1$. Before the rescheduling is described, the variables VV are classified via a data flow graph. The data flow graph of a particular execution instance of $T_2$ is partitioned into P disconnected subgraphs GG= {$G_1, \ldots, G_P$}, where P is a variable that depends upon the data flow graph. By doing so, variables in VV that are independent from groups of other variables that are mutually dependent are isolated. Next, all variables from VV that appear in a single subgraph $G_i$ are merged into a single variable $W_i$. This step ensures that dependencies among different variables are identified as a source of potential XrwX-type conflicts. In an XrwX-type race condition, r and w could be performed on different variables, however w could still be dependent upon the result of r both directly or indirectly via a variable that is local to $T_2$. Then, for each subgraph $G_i$, the sequence of accesses to $W_i$ is identified. Due to the race detection and/or tolerating mechanisms described herein, all operations in $G_i$ then are rescheduled and executed based upon the sequence of writes and reads to $W_i$ as follows:

prefix operations—WrW and RrwX such that ($\forall V_j \epsilon W_i$) $V_j=V''_j$—all instructions in $G_i$ are effectively executed before $T_1$.
  postfix operations—XwR, RXwW, and RrwR all instructions in $G_i$ are effectively executed after $T_1$.
  conflict operations—RrwX—all instructions in $G_i$ are effectively executed in parallel with operations in $T_1$ and require a custom resolution function f–f'.

Subgraphs with operations that affect only local variables of the malicious thread can be effectively scheduled in an arbitrary way with a preserved consistency of the computational state. These operations cannot cause a race with or without the race detection and/or tolerating mechanisms described herein.

Consideration is now given to an approach to address the case when a single variable V is protected using two different locks, $x_A$ and $x_B$ such that $V \subset A \cap B$, and when these locks are used by two critical sections that overlap, i.e., {$l(x_A)l(x_B)u(x_A)u(x_B)$}. Then, the race detection and/or tolerating mechanisms described herein copies V at the first lock $l(X_A)$ and resolves this variable at the last unlock $u(x_B)$. The actual resolution function is equivalent to the oracle described above.

In the general case of multi-threaded programs with threads that contain multi-variable critical sections that can intersect via nesting or overlapping, the race detection and/or tolerating mechanism oracle may not maintain sequential memory consistency. The race detection and/or tolerating mechanisms described herein does not introduce new conflicts among the interleaved operations of the malicious thread that are already tolerated (prefix and postfix) at the level of an individual critical section of the safe thread.

In the race detection and/or tolerating mechanisms described herein, the protection lifetime of a single variable V spans over all overlapping critical sections that could use distinct locks to protect it. Therefore, operations in the malicious thread that access V and that are tolerated by the race detection and/or tolerating mechanisms are effectively rescheduled either before the first lock or after the last unlock in the set of overlapping critical sections. As they are shifted outside of the range of protection they cannot create any new conflicts that are not allowed by the program specification.

The race detection and/or tolerating mechanisms described herein typically introduces only a mild restriction to the execution environment. As in-order execution is important only from the perspective of the programmer while debugging the code, due to the out-of-order execution that the race detection and/or tolerating mechanisms provide, in-order symbolic debugging on such systems could be difficult to achieve. Thus, in the race detection and/or tolerating mechanisms described herein a debugger should provide the user with the observability and controllability of all copies of the original shared variable. This means that the race detection and/or tolerating mechanisms described herein may not be transparent to the existing program development process. On the other hand, in-order execution is typically of little importance for testing or executing the release version of the developed software. Based upon that premise, most modern processors enable out-of-order execution to take advantage of programs' instruction level parallelism.

In the following, a low-overhead software implementation of the race detection and/or tolerating mechanisms described herein. In this example, an ICS (Instrumented Critical Section) that requires only changes to the code inside critical sections is shown. While this approach limits how effectively the implementation can distinguish between the race cases, it represents a practical point in the design space. Other embodiments may include other software implementations or hardware support for the race detection and/or tolerating mechanisms described herein.

Using the ICS embodiment, which is limited to modifying only code in the critical section, it follows that the ICS embodiment may be unable to distinguish between cases I, III, and $IV_B$, and case $IV_C$. This is true because the operation that distinguishes case $IV_C$ is the read in thread $T_2$. Because it is unknown when other threads read shared data without modifying all reads in the program, the conservative assumption is that these reads have happened and that the race cannot be tolerated. Hence, the ICS embodiment is able to probabilistically tolerate cases II and $IV_A$, and detect cases I, III, $IV_B$ and $IV_C$.

The ICS embodiment can be defined in terms of pseudocode with the following assumptions. It is assumed that there are K threads, $T_1, T_2, \ldots, T_K$, and that $T_1$ is a safe thread. Specifically, it is assumed that $T_1$ acquires and releases appropriate locks when accessing shared variables, and that the acquires and releases follow a stack discipline. It is assumed that there are n shared-variables, labeled $g[1] \ldots g[n]$. Each lock $l[1] \ldots [m]$ has a set of associated shared variables defined by $varSet[i] \subseteq \{1 \ldots n\}$, where if lock $l[i]$ protects $g[j]$ then $j \in varSet[i]$. For each shared variable, $g[i]$, a location is defined for its local copy, $local[i]$, and a location for its original value, $orig[i]$. For the purposes of exposition, it is assumed that these copies are all pre-allocated. Alternative implementations are discussed below. The race detection and/or tolerating mechanisms described herein ICS is defined as extensions to four operations performed in a critical section, defined below.

```
void TR_acquire(int i) {
    acquire(i);
    foreach j in varSet(i) {
        loc[j] = g[j];
        orig[j] = loc[j];
    }
}
word TR_read_shared(int i) {
    return loc[i];
}
void TR_write_shared(int i, word val) {
    loc[i] = val;
}
void TR_release(int i) {
    bool anyLocalWritten = false;
    bool anyGlobalWritten = false;
    // treat collection of vars as single var
    foreach j in varSet(i) {
        // check if the locals have been modified
        anyLocalWritten = anyLocalWritten ^
            (loc[j] != orig[j]);
        // check if any globals have been modified
        anyGlobalWritten = anyGlobalWritten ^
            (g[j] != orig[j]);
    }
    if (anyLocalWritten) {
        // some local copy modified
        if (!anyGlobalWritten) {
            // no changes globally
            // update globals with locals (T2; T1)
            foreach j in varSet(i) {
                g[j] = local[j];
            }
        } else {
            // both local and global updates
            RaceDetected( );
        }
    } else {
        // no local copy modified
        // global copy is up-to-date (T1; T2)
    }
    release(i);
}
```

In the above, acquiring a lock also involves copying the associated shared variables. Reads and writes to shared variables are unmodified. Releasing a lock is the most involved activity, and requires establishing whether any of the shared variables have been updated either locally or globally. In the implementation, the conservative assumption is made that if any of the local variables or global variables have been updated, that they all have. In practice, in many critical sections, the number of protected shared variables is small, and as a result, this conservative approximation does not significantly reduce the ability to tolerate actual races.

If it can be established that only the local or global values of shared variables have been modified, then the ICS embodiment is able to tolerate the race, as outlined above. Otherwise, a generic error handling routine may be called and the programmer is given the opportunity to stop executing or continue with a program-specific semantics.

As explained previously, because the copying and testing operations performed in the TR_acquire and TR_release are non-atomic, The ICS embodiment is prone to pre- and post-execution races that occur while these operations are in progress. One approach to mitigating this vulnerability includes reducing the impact of memory system latency on copying. Because the first read of a memory location can take much longer than subsequent reads, the loop that copies data into loc[j] in TR_acquire may take considerable time to execute. The following enhancement is proposed:

```
void TR_acquire(int i) {
    acquire(i);
    foreach j in varSet(i) {
        loc[j] = g[j];
    }
    // check again to make sure values are consistent
    foreach j in varSet(i) {
        if (loc[j] != g[j]) {
            loc[j] = g[j];
        }
        orig[j] = loc[j];
    }
}
```

The updated code checks after initially copying the variables to ensure that the local and global are still consistent. Because the first copy may take considerably more time, it is more likely that the variables will be made inconsistent in that period. The second for each loop, which accesses data already in its cache, may execute much faster. Similar changes to TR_release can be made to reduce the vulnerability of that code to internal races.

Storage for the local and original copies of shared data can be allocated any time up to when the lock protecting the data is acquired. Assuming that all shared data is known statically, statically allocating data for the copies has the lowest runtime cost and the highest space overhead. On the other end of the spectrum, storage for copies could be allocated on acquire and deallocated on release. This solution has the highest runtime cost and lowest space overhead. A compromise solution is to pre-allocate a pool of storage for shared data copies (e.g., similar to how thread pools are used) and share the objects in that pool between invocations of critical sections. In this case, the space and time cost are both amortized over the lifetime of the program.

It has been assumed herein that there was a known static association between locks and shared data. In the programmer's mind such a binding should exist at some level in order to write correct code. This relationship can be determined automatically in many cases using existing static analysis techniques or in cases where static analysis fails, programmer annotation may be used. Over-approximating the data protected by a lock will not result in incorrect behavior with the race detection and/or tolerating mechanisms described herein; the program will simply execute less efficiently. When static analysis methods improve, as they are likely to, the inefficiency introduced by over-approximation decreases.

It has been assumed that the pool of shared data was statically known and fixed in size. While this is not an uncommon occurrence, some applications share dynamic data and protect access to it with locks. Such structures present challenges for the ICS embodiment, because the association between locks and data is only determined dynamically, and the ICS embodiment as described above copies data protected by a lock when the lock is acquired.

One possible solution to this problem is to create local copies of shared data when the data is first either read or written in the critical section. This approach may require more overhead in the TR_read_shared and TR_write_shared routines. Furthermore, it may distribute the time over which copies of the shared data were taken, preventing the critical section from having a logically consistent starting point with respect to the values of all the variables.

An alternative approach may be to duplicate all shared data when a critical section is entered and track the specific data that is read or written when the critical section is executed. The overhead of this approach is more likely to be acceptable with hardware support.

Yet another alternative approach uses pre-computation when a critical section is entered to determine what specific shared data the critical section will touch. For example, if an iterator is being used on a data structure, then the iterator could be used simply to read all the data that will be touched in the critical section just prior to entering it. This approach may require program changes (to explicitly visit the data) and a programming style that allows it (e.g., iterators over shared data).

In typical usage, a lock is used to protect either an entire data structure or some subset of it (e.g., an entire hash table or a single chain). As a result, access to the structure may occur through a single shared pointer. One method of detecting (but not tolerating) races in such cases is to use the single pointer as a proxy for the entire data structure. Thus, when the lock is acquired, the thread acquiring it makes a local copy of the pointer and sets the global copy to NULL. Any errant thread illegally attempting to access the data structure will encounter a NULL pointer exception and fail, causing the race to be detected. This solution represents an ad hoc approach to hiding the overhead of copying significant amounts of shared dynamic data. If the methods of using the ICS embodiment described above result in too much overhead, embodiments can be combined with this method to reduce the overhead. The hardware embodiment can be particularly useful in this case because it can precisely determine the modified data items at the runtime at a finer granularity as and when data is modified without requiring the entire data structure to be copied in advance.

Returning now to discussion of the resolution function, in general a resolution function, such as RaceDetected above, is defined by the programmer. Depending upon whether the race detection and/or tolerating mechanisms described herein are used as a debugging, testing, prevention, or patching tool, RaceDetected could have different features, which are considered here. The programmer has semantic knowledge about $T_1$ as well as other threads, and this knowledge can be used to improve handling of cases that the mechanisms described herein cannot tolerate without that knowledge.

While debugging, a programmer could deploy the race detection and/or tolerating mechanisms described herein to instrument the executable in order to detect races dynamically. Assuming that the race detection and/or tolerating mechanisms described herein will be used in the final release version of the program, the programmer could focus her attention only to the race instances which the race detection and/or tolerating mechanisms described herein does not tolerate. In order to limit the performance overhead due to the race detection and/or tolerating mechanisms described herein only specific portions of the executable could be instrumented. For example, instrumentation sites can be pruned based on a particular lock, data, and region of code that are suspected to be involved in hard to reproduce race.

While testing an executable with a set of test vectors, the tester could deploy the race detection and/or tolerating mechanisms described herein to log all dynamically identified races that were not tolerated. These logs, in combination with results from a static analyzer, may make finding the cause of the race easier. Because it is low overhead, the race detection and/or tolerating mechanisms described herein can be used for stress testing that other dynamic race detectors are too slow for. In a testing context, warnings can be logged even for the races that can be tolerated.

Certain races are difficult to correct. Thus, the final software release could be augmented at specific race-occurring locations with the race detection and/or tolerating mechanisms described herein to reduce the likelihood of race occurrence. This could be done at release time or later when software patches are provided to users. Furthermore, if the behaviors of certain more common races are observed by the race detection and/or tolerating mechanisms described herein, a specific action to tolerate these races can be deployed via custom RaceDetected functions.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention also may be described in terms of methods comprising functional steps and/or non-functional acts. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment supporting multi thread operations, where different threads can perform read and write operations on shared data, the environment including safe threads that are properly configured to use variable locks on shared variables, a method of detecting and/or tolerating races occurring due to malicious threads not respecting the locks, the method comprising;
   (a) making at least one local copy of the shared data that is used exclusively by a safe thread when performing read and write operations during a critical section and wherein the safe thread refrains from writing to the shared data during the critical section and such that the shared data remains unchanged by the safe thread during the critical section, wherein the critical section defines a time frame in which a variable lock is placed on the shared data;
   (b) making at least one reference copy of the shared data that remains unchanged by the safe thread or a malicious thread during the critical section;
   (c) causing any read and write operations performed by the safe thread to be performed on the at least one local copy of the shared data during the critical section;
   (d) allowing any read and write operations performed by malicious threads to be performed on the shared data during the critical section;
   (e) comparing the shared data, the at least one local copy of the shared data, and the at least one reference copy of the shared data to determine that a race has been detected, a race existing when a final computation state of all threads after having executed does not correspond to a case when all the threads would have executed as safe threads with atomic and sequential memory consistency; and
   (f) at least one of indicating that a race has occurred or correcting the race.

2. The method of claim 1, further comprising applying a resolution function defining the value of the shared data to correct the race.

3. The method of claim 2, wherein applying a resolution function comprises causing one or more of the shared data to be the same value as the at least one local copy after operations have been performed on the at least one local copy resulting in changes of one or more value of the at least one local copy, when during the critical section any reads are performed by a malicious thread on the shared data, the reads being performed between writes by the safe thread on the at least one local copy.

4. The method of claim 2, wherein applying a resolution function comprises causing one or more of the shared data to be the same value as the at least one local copy after operations have been performed on the at least one local copy resulting in changes of one or more value of the at least one local copy when during the critical section any sequence of writes on the shared data by the malicious thread based on a previous read of the shared data by the malicious thread is interspersed between a write by the safe thread on the at least one local copy and any other operation by the safe thread on the at least one local copy.

5. The method of claim 2, wherein applying a resolution function is performed so as to minimize race conditions that may occur when defining the values of the shared data by taking advantage of memory caching by:
   (a) comparing the shared data after they have been defined to the value(s) to which they were defined;
   (b) re-defining the shared data if the shared data do not match the value(s) to which they were defined; and
   repeating acts (a) and (b) until the shared data match the value(s) to which they were defined.

6. The method of claim 1, wherein making at least one local copy and making at least one reference copy is performed so as to minimize race conditions that may occur when making copies by taking advantage of memory caching by:
   (a) comparing the at least one local copy and the at least one reference copy to the shared data after the copies have been made;
   (b) re-making the copies if the copies do not match the shared data; and
   repeating acts (a) and (b) until the copies match the shared data.

7. The method of claim 2, further comprising outputting an effective schedule of threads that results by applying the resolution function.

8. The method of claim 2, further comprising receiving programmer input defining a custom resolution function.

9. The method of claim 1, wherein acts (a)-(d) are performed in response to a safe thread entering the critical section.

10. The method of claim 1, wherein act (e) is performed after the critical section has been exited.

11. The method of claim 1, wherein the acts are performed by executing instructions hard coded into computer hardware.

12. The method of claim 1, wherein the acts are performed by executing software instructions loaded into a volatile memory of a computer system.

13. A computer storage device storing computer executable instructions that when executed by a processor of a computing system, cause the computing system to perform a method, the method comprising:
   (a) a computing system, having a processor, making at least one local copy of the shared data that is used exclusively by a safe thread when performing read and write operations during a critical section and wherein the safe thread refrains from writing to the shared data during the critical section and such that the shared data remains unchanged by the safe thread during the critical section, wherein the critical section defines a time frame in which a variable lock is placed on the shared data;
   (b) the computing system making at least one reference copy of the shared data that remains unchanged by the safe thread or a malicious thread during the critical section;
   (c) the computing system causing any read and write operations performed by the safe thread to be performed on the at least one local copy of the shared data during the critical section;
   (d) the computing system allowing any read and write operations performed by malicious threads to be performed on the shared data during the critical section;
   (e) the computing system comparing the shared data, the at least one local copy of the shared data, and the at least one reference copy of the shared data to determine that a race has been detected, a race existing when a final computation state of all threads after having executed does not correspond to a case when all the threads would have executed as safe threads with atomic and sequential memory consistency; and (f) the computing system at least one of indicating that a race has occurred or correcting the race.

14. A computer system comprising:

a processor;

a computer readable storage device, the computer readable storage device comprising computer executable instructions that, when executed by the processor, cause the computer to perform a method, the method comprising:
- (a) a processor making at least one local copy of the shared data that is used exclusively by a safe thread when performing read and write operations during a critical section and wherein the safe thread refrains from writing to the shared data during the critical section and such that the shared data remains unchanged by the safe thread during the critical section, wherein the critical section defines a time frame in which a variable lock is placed on the shared data;
- (b) the processor making at least one reference copy of the shared data that remains unchanged by the safe thread or a malicious thread during the critical section;
- (c) the processor causing any read and write operations performed by the safe thread to be performed on the at least one local copy of the shared data during the critical section;
- (d) the processor allowing any read and write operations performed by malicious threads to be performed on the shared data during the critical section;
- (e) the processor comparing the shared data, the at least one local copy of the shared data, and the at least one reference copy of the shared data to determine that a race has been detected, a race existing when a final computation state of all threads after having executed does not correspond to a case when all the threads would have executed as safe threads with atomic and sequential memory consistency; and
- (f) the processor at least one of indicating that a race has occurred or correcting the race.

15. The computer system of claim 14, wherein the computer readable storage device comprises volatile computer memory.

16. The computer system of claim 14, wherein the computer readable storage device comprises hard coded instructions.

* * * * *

UNITED STATES PATENT AND TRADEMARK OFFICE
CERTIFICATE OF CORRECTION

| | | |
|---|---|---|
| PATENT NO. | : 7,971,248 B2 | Page 1 of 1 |
| APPLICATION NO. | : 11/839017 | |
| DATED | : June 28, 2011 | |
| INVENTOR(S) | : Rahul Nagpal et al. | |

It is certified that error appears in the above-identified patent and that said Letters Patent is hereby corrected as shown below:

In column 20, line 42, in Claim 13, delete "that" and insert -- that, --, therefor.

Signed and Sealed this
Second Day of August, 2011

David J. Kappos
*Director of the United States Patent and Trademark Office*